US011301719B2

(12) United States Patent
Zhan et al.

(10) Patent No.: US 11,301,719 B2
(45) Date of Patent: Apr. 12, 2022

(54) SEMANTIC SEGMENTATION MODEL TRAINING METHODS AND APPARATUSES, ELECTRONIC DEVICES, AND STORAGE MEDIA

(71) Applicant: BEIJING SENSETIME TECHNOLOGY DEVELOPMENT CO., LTD., Beijing (CN)

(72) Inventors: Xiaohang Zhan, Beijing (CN); Ziwei Liu, Beijing (CN); Ping Luo, Beijing (CN); Chen Change Loy, Beijing (CN); Xiaoou Tang, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 180 days.

(21) Appl. No.: 16/726,880

(22) Filed: Dec. 25, 2019

(65) Prior Publication Data

US 2020/0134375 A1 Apr. 30, 2020

Related U.S. Application Data

(63) Continuation of application No. PCT/CN2018/097549, filed on Jul. 27, 2018.

(30) Foreign Application Priority Data

Aug. 1, 2017 (CN) .......................... 201710648545.7

(51) Int. Cl.
*G06K 9/62* (2022.01)
*G06N 3/04* (2006.01)
(Continued)

(52) U.S. Cl.
CPC ......... *G06K 9/6256* (2013.01); *G06K 9/6262* (2013.01); *G06N 3/0454* (2013.01);
(Continued)

(58) Field of Classification Search
CPC .... G06K 9/6256; G06K 9/342; G06K 9/6262; G06K 9/726; G06K 9/34; G06K 9/6259;
(Continued)

(56) References Cited

U.S. PATENT DOCUMENTS

2014/0003713 A1* 1/2014 Seow ...................... G06T 5/009
382/164
2016/0055237 A1* 2/2016 Tuzel ................... G06K 9/6282
382/224

(Continued)

FOREIGN PATENT DOCUMENTS

CN 105787482 A 7/2016
CN 106022221 A 10/2016

(Continued)

OTHER PUBLICATIONS

International Search Report in the international application No. PCT/CN2018/097549, dated Oct. 31, 2018.
English translation of the Written Opinion of the International Search Authority in the international application No. PCT/CN2018/097549, dated Oct. 31, 2018.

(Continued)

*Primary Examiner* — John W Lee
(74) *Attorney, Agent, or Firm* — Syncoda LLC; Feng Ma

(57) ABSTRACT

A semantic segmentation model training method includes: performing, by a semantic segmentation model, image semantic segmentation on at least one unlabeled image to obtain a preliminary semantic segmentation result as the category of the unlabeled image; obtaining, by a convolutional neural network based on the category of the at least one unlabeled image and the category of at least one labeled image, sub-images respectively corresponding to the at least two images and features corresponding to the sub-images, where the at least two images comprise the at least one unlabeled image and the at least one labeled image, and the at least two sub-images carry the categories of the corresponding images; and training the semantic segmentation model on the basis of the categories of the at least two (Continued)

sub-images and feature distances between the at least two sub-images.

20 Claims, 5 Drawing Sheets

(51) Int. Cl.
 *G06N 3/08* (2006.01)
 *G06V 10/26* (2022.01)
 *G06V 30/262* (2022.01)

(52) U.S. Cl.
 CPC ........... *G06N 3/084* (2013.01); *G06V 10/267* (2022.01); *G06V 30/274* (2022.01)

(58) Field of Classification Search
 CPC .... G06K 9/6271; G06N 3/0454; G06N 3/084; G06N 3/08
 See application file for complete search history.

(56) References Cited

U.S. PATENT DOCUMENTS

| 2016/0180151 A1* | 6/2016 | Philbin ................ G06K 9/6256 382/118 |
| 2018/0225828 A1 | 8/2018 | Guo et al. |
| 2018/0259608 A1 | 9/2018 | Golden et al. |

FOREIGN PATENT DOCUMENTS

| CN | 108229479 A | 6/2018 |
| JP | 2018097807 A | 6/2018 |
| WO | 2017091833 A1 | 6/2017 |
| WO | 2017163759 A1 | 9/2017 |
| WO | 2019019019 A1 | 1/2019 |

OTHER PUBLICATIONS

First Office Action of the Chinese application No. 201710648545.7, dated Apr. 23, 2019.
Xiaohang Zhan, Ziwei Liu, et al; Mix-and-Match Tuning for Self-Supervised Semantic Segmentation, 2018.

* cited by examiner

SEMANTIC SEGMENTATION MODEL TRAINING METHODS AND APPARATUSES, ELECTRONIC DEVICES, AND STORAGE MEDIA

CROSS-REFERENCE TO RELATED APPLICATIONS

The present application is a continuation of International Application No. PCT/CN2018/097549 filed on Jul. 27, 2018, which claims priority to Chinese Patent Application No. 201710648545.7 filed on Aug. 1, 2017. The disclosures of these applications are hereby incorporated by reference in their entirety.

BACKGROUND

In image semantic segmentation, by correspondingly assigning a determination label to output of each pixel of an inputted image, it can be indicated what object or category the pixel most likely belongs to, and this is a significant task in the field of computer vision and applicable to machine scene understanding, video analysis, and the like.

SUMMARY

Embodiments of the present disclosure relate to computer vision technologies, and in particular, semantic segmentation model training methods and apparatuses, electronic devices, and storage media.

Embodiments of the present disclosure provide semantic segmentation model training technologies.

A semantic segmentation model training method provided by embodiments of the present disclosure includes: performing, by a semantic segmentation model, image semantic segmentation on at least one unlabeled image to obtain a preliminary semantic segmentation result as the category of the unlabeled image; obtaining, by a convolutional neural network based on the category of the at least one unlabeled image and the category of at least one labeled image, sub-images respectively corresponding to the at least two images and features corresponding to the sub-images, where the at least two images comprise the at least one unlabeled image and the at least one labeled image, and the at least two sub-images carry the categories of the corresponding images; and training the semantic segmentation model on the basis of the categories of the at least two sub-images and feature distances between the at least two sub-images.

According to another aspect of the embodiments of the present disclosure, provided is a semantic segmentation model training apparatus, including a memory storing processor-executable instructions; and a processor arranged to execute the stored processor-executable instructions to perform operations of: performing, by a semantic segmentation model, image semantic segmentation on at least one unlabeled image to obtain a preliminary semantic segmentation result as a category of the at least one unlabeled image; obtaining, by a convolutional neural network based on the category of the at least one unlabeled image and a category of at least one labeled image, sub-images respectively corresponding to at least two images and features corresponding to the sub-images, wherein the at least two images comprise the at least one unlabeled image and the at least one labeled image, and the at least two sub-images carry the categories of the corresponding images; and training the semantic segmentation model on the basis of the categories of the at least two sub-images and feature distances between the at least two sub-images.

According to another aspect of the embodiments of the present disclosure, provided is a semantic segmentation model training apparatus, including: a segmentation unit, configured to perform, by a semantic segmentation model, image semantic segmentation on at least one unlabeled image to obtain a preliminary semantic segmentation result as the category of the unlabeled image; a sub-image extraction unit, configured to obtain, by a convolutional neural network based on the category of the at least one unlabeled image and the category of at least one labeled image, sub-images respectively corresponding to the at least two images and features corresponding to the sub-images, where the at least two images comprise the at least one unlabeled image and the at least one labeled image, and the at least two sub-images carry the categories of the corresponding images; and a training unit, configured to train the semantic segmentation model on the basis of the categories of the at least two sub-images and feature distances between the at least two sub-images.

According to another aspect of the embodiments of the present disclosure, provided is an electronic device, including a processor, where the processor includes the semantic segmentation model training apparatus.

According to yet another aspect of the embodiments of the present disclosure, provided is an electronic device, including: a memory, configured to store executable instructions; and a processor configured to communicate with the memory to execute the executable instructions so as to complete operations of the semantic segmentation model training method above.

According to another aspect of the embodiments of the present disclosure, provided is a computer storage medium, configured to store computer-readable instructions, where when the instructions are executed, the operations of the semantic segmentation model training method as stated above are executed.

According to yet another aspect of the embodiments of the present disclosure, provided is a computer program, including a computer-readable code, where when the computer-readable code runs in a device, a processor in the device executes instructions for implementing operations of the semantic segmentation model training method according to any one of the embodiments of the present disclosure.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
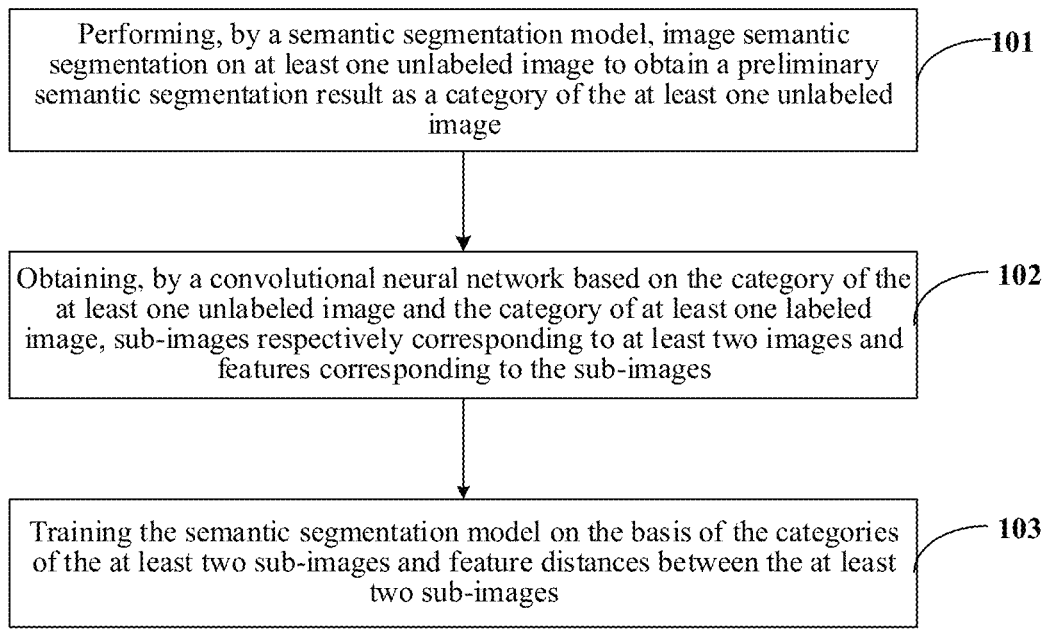
FIG. 1 is a flowchart of some embodiments of a semantic segmentation model training method according to the present disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each section shown in the accompanying drawings is not drawn in an actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like, to perform specific tasks or implement specific abstract data types. The computer system/server may be practiced in the distributed cloud computing environments in which tasks are performed by remote processing devices that are linked through a communications network. In the distributed computing environments, the program modules may be located in local or remote computing system storage media including storage devices.

FIG. 1 is a flowchart of some embodiments of a semantic segmentation model training method according to the present disclosure. As shown in FIG. 1, the method of this embodiment includes operations 101 to 103.

In operation 101, image semantic segmentation on at least one unlabeled image is performed by a semantic segmentation model to obtain a preliminary semantic segmentation result as the category of the unlabeled image, where the unlabeled image indicates that the categories (for example, semantic categories) of some or all pixels in the image are undefined, and in the present embodiment, exemplarily, image semantic segmentation may be performed on the unlabeled image by using a known semantic segmentation model to obtain a semantic segmentation result with noise.

In one optional example, operation 101 may be executed by a processor by invoking a corresponding instruction stored in a memory, or may be executed by a segmentation unit 41 run by the processor.

In operation 102, sub-images respectively corresponding to the at least two images and features corresponding to the sub-images are obtained by a convolutional neural network based on the category of the at least one unlabeled image and the category of at least one labeled image, where the at least two images include the at least one unlabeled image and the at least one labeled image, and the at least two sub-images carry the categories of the corresponding images. Optionally, by enabling a select box with a settable size to move in the image, and then determining whether pixels in the select box belong to the same category according to the categories of the pixels in the image, when over a set proportion of pixels in the select box belongs to the same category, the select box can be outputted as a sub-image.

In an optional example, operation 102 may be executed by a processor by invoking a corresponding instruction stored in a memory, or may be executed by a sub-image extraction unit 42 run by the processor.

In operation 103, the semantic segmentation model is trained on the basis of the categories of the at least two sub-images and feature distances between the at least two sub-images.

In an optional example, operation 103 may be executed by a processor by invoking a corresponding instruction stored in a memory, or may be executed by a training unit 43 run by the processor.

Based on the semantic segmentation model training method provided by the embodiment of the present disclosure above, image semantic segmentation is performed on an unlabeled image by a semantic segmentation model so as to allow the unlabeled image to obtain a category with noise; based on the category of the unlabeled image and the category of a labeled image, sub-images respectively corresponding to the at least two images are obtained, and both the labeled image and the unlabeled image are applied to training, thereby achieving self-supervised training; feature extraction on the sub-images is carried out by a convolutional neural network; and training on the semantic segmentation model is achieved based on the categories of the at least two sub-images and feature distances between the at least two sub-images. By training, a semantic segmentation model learnt in a self-supervised mode and having relatively strong semantic distinction is obtained, and high accuracy in semantic segmentation can be achieved.

Self-supervised learning means that training is carried out using an image not carrying a label to obtain an image descriptor, where the image descriptor may be configured to describe a high-dimensional vector of image semantic information; and then semantic segmentation training is carried out using the image descriptor.

In another example of the semantic segmentation model training method of the present disclosure, based on the embodiment above, operation 103 includes:

establishing a patch graph according to category relations between the sub-images, where the patch graph includes nodes and an edge, the nodes include the sub-images, and the edge includes a feature distance between any two sub-images; and training the semantic segmentation model to enable the feature distance between two sub-images of the same category in the patch graph to be lower than a first preset value, and the feature distance between two sub-images of different categories to be greater than a second preset value.

Figure 2:
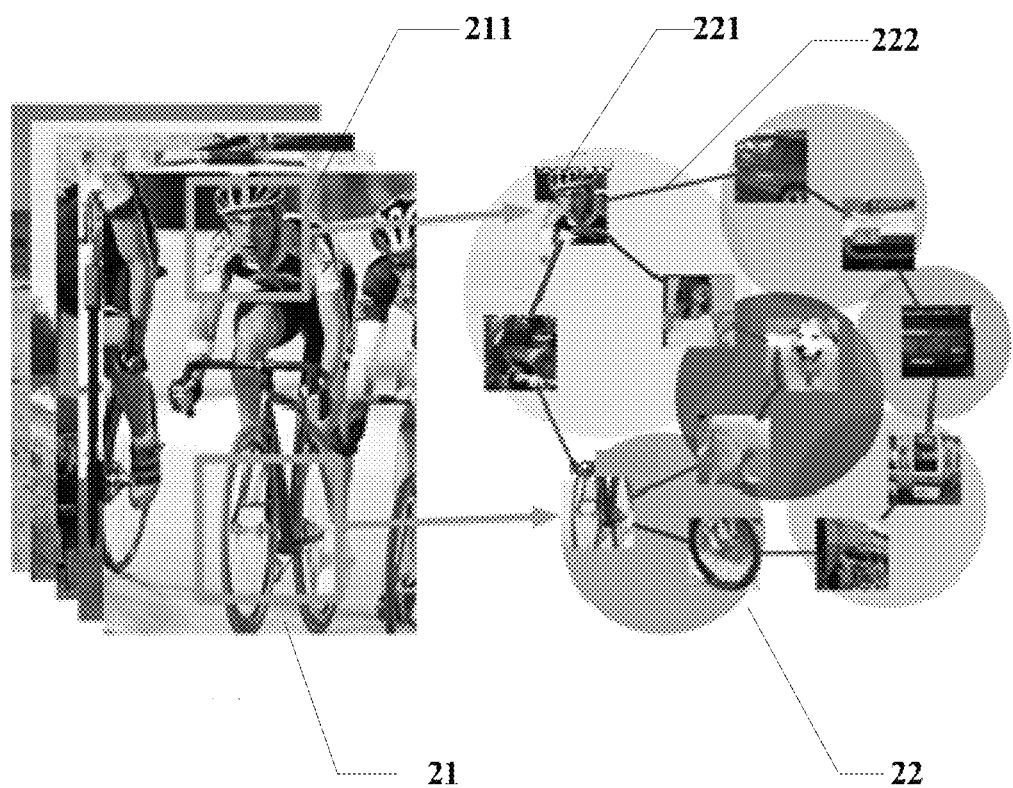
FIG. 2 is an exemplary schematic diagram of a semantic segmentation model training method according to the present disclosure establishing a patch graph.

In the present embodiment, FIG. 2 is an exemplary schematic diagram of a semantic segmentation model training method according to the present disclosure establishing a patch graph. As illustrated in FIG. 2, in order to establish the patch graph 22, first a node 221 is required to be determined. In the present embodiment, the sub-image is used as the node 221, at least one sub-image is selected from any image 21 of a known category by a select box 211, and a feature distance between sub-images having a connection relation is used as an edge 222 (in FIG. 2, a feature in a select box in middle-layer features is the feature of the sub-image), where the connection relation between the sub-images is decided according to corresponding categories of the sub-images; the feature of the sub-image is a feature selected by a corresponding select box from a feature map outputted by an output layer of a convolutional neural network; optionally, the output layer is any layer in middle or deep layers in the convolutional neural network; one of the middle or deep layers in the convolutional neural network is used as the output layer, where shallow-layer feature of an image generally represents information such as some edges, corners, or points of an object in the image, a middle-layer feature of the image generally represents information of some components (for example, a wheel of a vehicle, or the nose on a face) of the object, and a deep-layer feature of the image generally represents overall category information (for example, human beings, vehicles, or horses) of the image; in order to establish an image based on a sub-image and optimize a parameter, one of the middle or deep layers is selected as the output layer for a labeled image and an unlabeled image, and based on the practice, the optimal effect of a middle-layer feature is higher than that of a deep-layer feature; a first preset value and a second preset value are set in advance, and usually, the second preset value is greater than the first preset value, a feature distance between two sub-images of the same category can be decreased and a feature distance between two sub-images of different categories can be increased by the first preset value and the second value.

Figure 3:
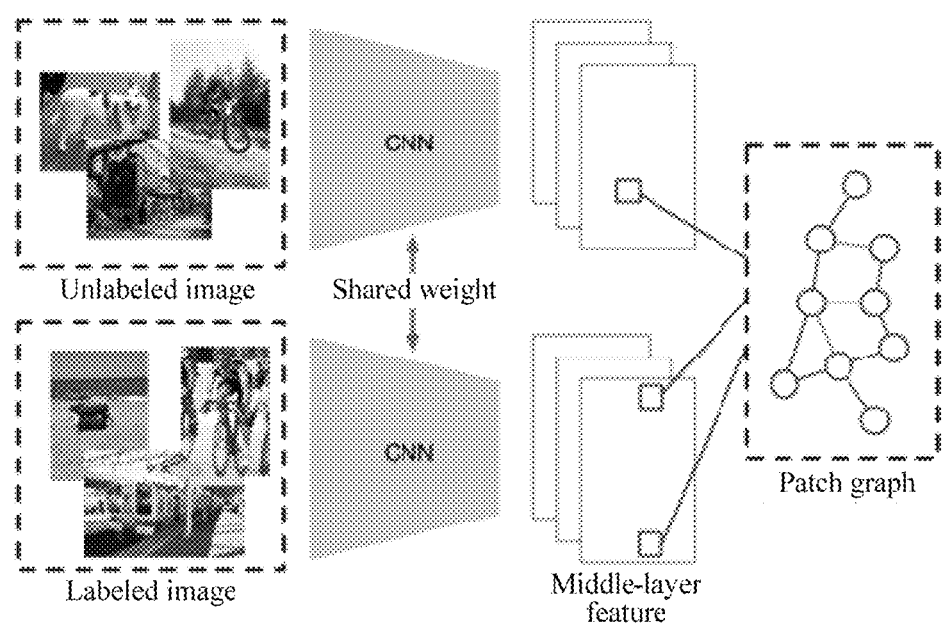
FIG. 3 is another exemplary schematic diagram of a semantic segmentation model training method according to the present disclosure establishing a patch graph.

FIG. 3 is another exemplary schematic diagram of a semantic segmentation model training method according to the present disclosure establishing a patch graph. The method in the embodiment includes: obtaining, by a convolutional neural network (a CNN in FIG. 3) based on the category of at least one unlabeled image (the category of the unlabeled image may be obtained based on a known semantic segmentation model) and the category of at least one labeled image, sub-images respectively corresponding to the at least two images and features corresponding to the sub-images (features corresponding to positions of the sub-images in middle-layer features in FIG. 3); and establishing a patch graph according to category relations between the sub-images, where the patch graph includes nodes and an edge (a circle in the patch graph in FIG. 3 indicates a node, and a line connecting two circles indicates an edge), the nodes include the sub-images, and the edge includes a feature distance between any two sub-images.

In one optional example of the embodiments of the semantic segmentation model training method of the present disclosure, the establishing a patch graph according to category relations between the sub-images includes:

selecting at least one sub-image as a reference node, and for the at least one reference node:

using a sub-image of the same category as the reference node as a positively correlated node, using a sub-image of a different category from the reference node as a negatively correlated node, and separately establishing a positive correlation connection between the reference node and at least one positively correlated node, and a negative correlation connection between the reference node and at least one negatively correlated node; and forming a sparse connectivity patch graph according to the at least one reference node, the positively correlated node of the reference node, the negatively correlated node of the reference node, the positive correlation connection, and the negative correlation connection.

In the present example, the process of establishing the patch graph is randomly selecting multiple sub-images from the at least two sub-images, separately using the randomly selected sub-images as anchors, and based on the semantic categories, randomly selecting one sub-image of the same category as the anchor as a positive image, and randomly selecting one sub-image of a different semantic category from the anchor as a negative image, where at this time, two connections are established on one sub-image: anchor-positive and anchor-negative; and based on the connections, a sparse connectivity patch graph is established.

In one optional example of the embodiments of the semantic segmentation model training method of the present disclosure, the training the semantic segmentation model includes:

training the semantic segmentation model by a gradient back propagation algorithm, so as to minimize an error of the convolutional neural network, where the error is a triplet loss of the features of the corresponding sub-images obtained based on the convolutional neural network.

In the present embodiment, the error of the convolutional neural network is reduced by the gradient back propagation algorithm, so as to optimize a parameter of at least one layer from the first layer to the output layer in the convolutional neural network; the gradient Back Propagation (BP) algorithm is a learning algorithm suitable for a multi-layer neuron network under guidance of a supervisor, and is built based on a gradient descent method. An input-output relation of a BP network is essentially a mapping relation: the function achieved by a BP neural network with n inputs and m outputs is continuous mapping from an n-dimensional Euclidean space to a finite field in an m-dimensional Euclidean space, where this mapping has high nonlinearity. The learning process of the BP algorithm consists of a forward propagation process and a back propagation process. In the forward propagation processing, input information passes through an input layer, is processed by hidden layers one by one, and then is sent to the output layer; if the output layer cannot acquire an expected output value, the sum of squares of errors between the output and the expectation is used as a target function, and then the back propagation is entered to calculate partial derivatives of the target function and different neuron weights layer by layer, so as to constitute gradient values of the target function with respect to weight vectors as bases for modifying the weights; the network learning is completed in the weight modification process. When the error reaches the expected value, the network learning is ended.

The edge in the patch graph is obtained based on the feature distance between the sub-images outputted by the output layer, where the output layer is one of the middle or deep layers. Therefore, not parameters of all the layers in the convolutional neural network are optimized, but the parameters of layers from the first layer to the output layer; therefore, similarly, in the error calculation process, the error of at least one layer from the output layer to the first layer is calculated.

In one optional example of the embodiments of the semantic segmentation model training method of the present disclosure, the training the semantic segmentation model by a gradient back propagation algorithm includes:

calculating the maximum error by a loss function according to the feature distance between the sub-images in the established patch graph;

performing gradient back propagation on the maximum error to calculate an error of at least one layer in the convolutional neural network;

calculating the gradient of parameters of at least one layer according to the error of the at least one layer, and modifying the parameters of the corresponding layer in the convolutional neural network according to the gradient;

calculating an error according to the distance between sub-images outputted by the convolutional neural network with the optimized parameters, and taking the error as the maximum error;

iteratively implementing following operations until the maximum error is lower than or equal to a preset value: performing gradient back propagation on the maximum error to calculate an error of at least one layer in the convolutional neural network; and calculating the gradient of parameters of at least one layer according to the error of the at least one layer, and modifying the parameters of the corresponding layer in the convolutional neural network according to the gradient.

In the present embodiment, the loss function is first defined, and network parameters in the convolutional neural network are optimized by minimizing the loss function. The formula of the loss function is as illustrated in the following formula (1):

$$\min \sum_i^N \sum_{c \in C} -\log q(c \mid z^{(i)}) \simeq \qquad (1)$$

$$\sum_i^N \max(0, \|z_{anc}^{(i)} - z_{pos}^{(i)}\| - \|z_{anc}^{(i)} - z_{neg}^{(i)}\| + m)$$

where $\|z_{anc}^{(i)} - z_{pos}^{(i)}\|$ represents a distance between the anchor and the positive in the patch graph established based on the sub-images, $\|z_{anc}^{(i)} - z_{neg}^{(i)}\|$ represents a distance between the anchor and the negative in the patch graph established based on the sub-images, and m represents a constant value. The formula is obtained based on a triplet loss function in the prior art, and parameters in each layer of a convolutional neural network are optimized based on the calculated error and by using a gradient back propagation algorithm.

In one optional example of the embodiments of the semantic segmentation model training method of the present disclosure, the process of training the semantic segmentation model may include:

obtaining parameters of the convolutional neural network based on the training result of the convolutional neural network; and initializing parameters in the semantic segmentation model based on the obtained parameters of the convolutional neural network.

in the present embodiment, because the semantic segmentation model also belongs to the convolutional neural network, the parameters of the convolutional neural network obtained by training have relatively strong distinction in semantic categories, relatively high accuracy can be obtained in semantic segmentation, and parameters of an original semantic segmentation model are replaced by the parameters of the convolution neural network so that the trained semantic segmentation model can be obtained.

In another example of the semantic segmentation model training method of the present disclosure, based on the embodiment above, operation 102 may include:

in response to movement of a select box with a preset size on the at least two images, performing determination on pixels in the select box, and when the proportion of pixels of the same semantic category among the pixels in the select box is greater than or equal to a preset value, outputting the image in the select box as a sub-image, and labeling the sub-image as said category; and obtaining features corresponding to the sub-images by the convolutional neural network.

In the present embodiment, the at least two images are segmented by a select box with a settable size, where the at least two images include an unlabeled image and a labeled image; when the proportion of the pixels of the same category (for example, a semantic category) in the pixels in the select box is greater than or equal to the preset value, the select box may be classified as said category, and the pixels in the select box are outputted as the sub-images; the size of the select box is adjustable, and when no sub-image is obtained from the image by the select box of a certain size, segmentation may be performed again by adjusting the size of the select box until a certain number of images is obtained.

In one optional example of the embodiments of the semantic segmentation model training method of the present disclosure, operation 102 may further include: when the proportion of the pixels of the same category among the pixels in the select box is less than the preset value, discarding the select box.

In the present example, the select box of a set size is required to move pixel by pixel in an image to avoid missing any optional sub-image; when multiple categories exist in one select box but the respective proportions of pixels of the multiple categories are all less than the preset value, the select box cannot determine a category, and at this time, the select box is required to move to a next position and perform determination at the next position; when no sub-image is obtained from the image by the select box of the set size, the size of the select box is required to be adjusted, and selection is performed on the image again.

In one optional example of the embodiments of the semantic segmentation model training method of the present disclosure, the obtaining features corresponding to the sub-images by the convolutional neural network includes:

perform feature extraction respectively on the unlabeled image and the labeled image by the convolutional neural network, so as to obtain features maps corresponding to the unlabeled image and the labeled image; and obtaining, based on the position and size of the select box corresponding to the sub-image, the corresponding feature in the select box from the corresponding feature map, so as to determine the features corresponding to the sub-images.

In the present embodiment, by obtaining the positions and sizes of the select boxes for the sub-images, the features of the sub-images are selected from the corresponding features maps of the output layer of the convolutional neural network by select boxes at the same positions and of the same sizes, so that a feature distance between any two sub-images is obtained based on the features of the sub-images.

In one optional example of the embodiments of the semantic segmentation model training method of the present disclosure, before operation 102, a operation of initializing parameters in the convolutional neural network based on the parameters in the semantic segmentation model is further included.

Exemplarily, in order to obtain more accurate features, parameters of the convolutional neural network are initialized by using the parameters in the semantic segmentation model.

In another example of the semantic segmentation model training method of the present disclosure, based on the embodiment above, before operation 101, the following operation may further be included:

using stochastic gradient descent to train the semantic segmentation model until a preset convergence condition is satisfied.

The present embodiment implements fine adjustment on the semantic segmentation model. Optionally, the fine adjustment process may include: 1. using a semantic segmentation model of a VGG-16 network structure; 2. setting an initial learning rate of the semantic segmentation model as 0.01, which may iteratively descend by 10 times every 30000 rounds; 3. using a random gradient descent algorithm to finely adjust and optimize a semantic segmentation task, where in this process, eight GPUs are used to conduct distributed computing; 4. a random gradient descent algorithm: randomly selecting a batch of data (16 images in this case), inputting the data to a network, performing forward propagation to obtain a result, calculating an error between the result and a labeled result, using back propagation to obtain at least one layer of errors, calculating the gradient of parameters of at least one layer according to the at least one layer of errors, correcting the parameter values according to the gradient, and making the model converge in a constant correction process; 5. making the model to converge at the 60000 rounds of iteration; and 6. using the semantic segmentation model to performing a test on an existing public data set.

In another example of the semantic segmentation model training method of the present disclosure, based on the embodiment above, before operation 102, the following operation may further be included:

using stochastic gradient descent to train the convolutional neural network until a preset convergence condition is satisfied.

The present embodiment implements fine adjustment on the convolutional neural network. Optionally, the fine adjustment process may include: 1. using a convolutional neural network of a VGG-16 network structure; 2. setting an initial learning rate of the convolutional neural network as 0.01, which may iteratively descend by 10 times every 30000 rounds; 3. using a random gradient descent algorithm to finely adjust and optimize a semantic segmentation task, where in this process, eight GPUs are used to conduct distributed computing; 4. a random gradient descent algorithm: randomly selecting a batch of data (16 images in this case), inputting the data to a network, performing forward propagation to obtain a result, calculating an error between the result and a labeled result, using back propagation to obtain at least one layer of errors, calculating the gradient of parameters of at least one layer according to the at least one layer of errors, correcting the parameter values according to the gradient, and making the network converge in a constant correction process; 5. making the network to converge at the 60000 rounds of iteration; and 6. using the convolutional neural network to performing a test on an existing public data set.

A person of ordinary skill in the art may understand that: all or some operations of implementing the forgoing embodiments of the method may be achieved by a program by instructing related hardware; the foregoing program may be stored in a computer-readable storage medium; when the program is executed, operations including the foregoing embodiments of the method are performed; moreover, the foregoing storage medium includes various media capable of storing program codes such as an ROM, an RAM, a magnetic disk, or an optical disk.

Figure 4:
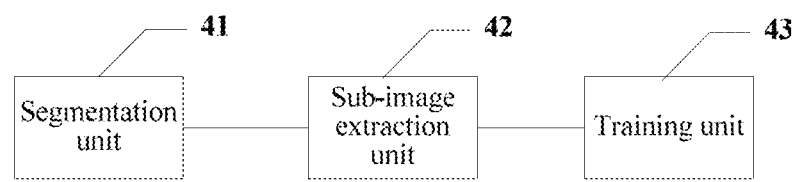
FIG. 4 is a schematic structural diagram of some embodiments of a semantic segmentation model training apparatus of the present disclosure.

FIG. 4 is a schematic structural diagram of some embodiments of a semantic segmentation model training apparatus of the present disclosure. The apparatus of this embodiment is used for implementing the foregoing method embodiments of the present disclosure. As shown in FIG. 4, the apparatus of this embodiment includes:

a segmentation unit 41, configured to perform, by a semantic segmentation model, image semantic segmentation on at least one unlabeled image to obtain a preliminary semantic segmentation result as the category of the unlabeled image;

a sub-image extraction unit 42, configured to obtain, by a convolutional neural network based on the category of the at least one unlabeled image and the category of at least one labeled image, sub-images respectively corresponding to the at least two images and features corresponding to the sub-images, where the at least two images include the at least one unlabeled image and the at least one labeled image, and the at least two sub-images carry the categories of the corresponding images; and a training unit 43, configured to train the semantic segmentation model on the basis of the categories of the at least two sub-images and feature distances between the at least two sub-images.

Based on the semantic segmentation model training apparatus provided by the embodiment of the present disclosure above, image semantic segmentation is performed on an unlabeled image by a semantic segmentation model so as to allow the unlabeled image to obtain a category with noise; based on the category of the unlabeled image and the category of a labeled image, sub-images respectively corresponding to the at least two images are obtained, and both the labeled image and the unlabeled image are applied to training, thereby achieving self-supervised training; feature extraction on the sub-images is carried out by a convolutional neural network; and training on the semantic segmentation model is achieved based on the categories of the at least two sub-images and feature distances between the at least two sub-images. By training, a semantic segmentation model learnt in a self-supervised mode and having relatively strong semantic distinction is obtained, and high accuracy in semantic segmentation can be achieved.

In another example of the semantic segmentation model training apparatus of the present disclosure, based on the embodiment above, the training unit 43 includes:

a patch graph establishing module, configured to establish a patch graph according to category relations between the sub-images, where the patch graph includes nodes and an edge, the nodes include the sub-images, and the edge includes a feature distance between any two sub-images; and a model training module, configured to train the semantic segmentation model to enable the feature distance between two sub-images of the same category in the patch graph to be lower than a first preset value, and the feature distance between two sub-images of different categories to be greater than a second preset value.

In the present embodiment, in order to establish the patch graph, first a node is required to be determined. In the present embodiment, the sub-image is used as the node, and a feature distance between sub-images having a connection relation is used as an edge, where the connection relation between the sub-images is decided according to corresponding categories of the sub-images; the feature of the sub-image is a feature selected by a corresponding select box from a feature map outputted by an output layer of a convolutional neural network; optionally, the output layer is any layer in middle or deep layers in the convolutional neural network; one of the middle or deep layers in the convolutional neural network is used as the output layer, where shallow-layer feature of an image generally represents information such as some edges, corners, or points of an object in the image, a middle-layer feature of the image generally represents information of some components (for example, a wheel of a vehicle, or the nose on a face) of the object, and a deep-layer feature of the image generally represents overall category information (for example, human beings, vehicles, or horses) of the image; in order to establish an image based on a sub-image and optimize a parameter, one of the middle or deep layers is selected as the output layer for a labeled image and an unlabeled image, and based on the practice, the optimal effect of a middle-layer feature is higher than that of a deep-layer feature; a first preset value and a second preset value are set in advance, and usually, the second preset value is greater than the first preset value, a feature distance between two sub-images of the same category can be decreased and a feature distance between two sub-images of different categories can be increased by the first preset value and the second value.

In one optional example of the embodiments of the semantic segmentation model training apparatus of the present disclosure, the patch graph establishing module includes:

a reference selection module, configured to select at least one sub-image as a reference node;

a connection relation establishing module, configured to, for the at least one reference node, use a sub-image of the same category as the reference node as a positively correlated node, use a sub-image of a different category from the reference node as a negatively correlated node, separately establish a positive correlation connection between the reference node and at least one positively correlated node, and separately establish a negative correlation connection between the reference node and at least one negatively correlated node; and a connection map establishing module, configured to form a sparse connectivity patch graph according to the at least one reference node, the positively correlated node of the reference node, the negatively correlated node of the reference node, the positive correlation connection, and the negative correlation connection.

In one optional example of the embodiments of the semantic segmentation model training apparatus of the present disclosure, the model training module includes:

a network training module, configured to train the semantic segmentation model by a gradient back propagation algorithm, so as to minimize an error of the convolutional neural network, where the error is a triplet loss of the features of the corresponding sub-images obtained based on the convolutional neural network.

In one optional example of the embodiments of the semantic segmentation model training apparatus of the present disclosure, the network training module is specifically configured to:

calculate the maximum error by a loss function according to the feature distance between the sub-images in the established patch graph;

perform gradient back propagation on the maximum error to calculate an error of at least one layer in the convolutional neural network;

calculate the gradient of parameters of at least one layer according to the error of the at least one layer, and modify the parameters of the corresponding layer in the convolutional neural network according to the gradient;

calculate an error according to the distance between sub-images outputted by the convolutional neural network with the optimized parameters, and taking the error as the maximum error;

iteratively implement following operations until the maximum error is lower than or equal to a preset value: performing gradient back propagation on the maximum error to calculate an error of at least one layer in the convolutional neural network; and calculating the gradient of parameters of at least one layer according to the error of the at least one layer, and modifying the parameters of the corresponding layer in the convolutional neural network according to the gradient.

In one optional example of the embodiments of the semantic segmentation model training apparatus of the present disclosure, the model training module further includes:

a segmentation model training module, configured to obtain parameters of the convolutional neural network based on the training result of the convolutional neural network; and initialize parameters in the semantic segmentation model based on the obtained parameters of the convolutional neural network.

In another example of the semantic segmentation model training apparatus of the present disclosure, based on the embodiment above, the sub-image extraction unit is configured to, in response to movement of a select box with a preset size on the at least two images, perform determination on pixels in the select box, and when the proportion of pixels of the same category among the pixels in the select box is greater than or equal to a preset value, output the image in the select box as a sub-image, and label the sub-image as said category; and obtain features corresponding to the sub-images by the convolutional neural network.

In the present embodiment, the at least two images are segmented by a select box with a settable size, where the at least two images include an unlabeled image and a labeled image; when the proportion of the pixels of the same category (for example, a semantic category) in the pixels in the select box is greater than or equal to the preset value, the select box may be classified as said category, and the pixels in the select box are outputted as the sub-images; the size of the select box is adjustable, and when no sub-image is obtained from the image by the select box of a certain size, segmentation may be performed again by adjusting the size of the select box until a certain number of images is obtained.

In one optional example of the embodiments of the semantic segmentation model training apparatus of the present disclosure, the sub-image extraction unit may further be configured to: when the proportion of the pixels of the same category among the pixels in the select box is less than the preset value, discard the select box.

In one optional example of the embodiments of the semantic segmentation model training apparatus of the present disclosure, the sub-image extraction unit, when obtaining the features corresponding to the sub-images by the convolutional neural network, is configured to perform feature extraction respectively on the unlabeled image and the labeled image by the convolutional neural network, so as to obtain features maps corresponding to the unlabeled image and the labeled image; and obtain, based on the position and size of the select box corresponding to the sub-image, the corresponding feature in the select box from the feature map corresponding to the labeled image, so as to determine the features corresponding to the sub-images.

In another example of the semantic segmentation model training apparatus of the present disclosure, based on the embodiment above, the apparatus further includes a model fine adjustment unit, configured to use stochastic gradient descent to train the semantic segmentation model until a preset convergence condition is satisfied.

The present embodiment implements fine adjustment on the semantic segmentation model. Optionally, the fine adjustment process may include: 1. using a semantic segmentation model of a VGG-16 network structure; 2. setting an initial learning rate of the semantic segmentation model as 0.01, which may iteratively descend by 10 times every 30000 rounds; 3. using a random gradient descent algorithm to finely adjust and optimize a semantic segmentation task, where in this process, eight GPUs are used to conduct distributed computing; 4. a random gradient descent algorithm: randomly selecting a batch of data (16 images in this case), inputting the data to a network, performing forward propagation to obtain a result, calculating an error between the result and a labeled result, using back propagation to obtain at least one layer of errors, calculating the gradient of parameters of at least one layer according to the at least one layer of errors, correcting the parameter values according to the gradient, and making the model converge in a constant correction process; 5. making the model to converge at the 60000 rounds of iteration; and 6. using the semantic segmentation model to performing a test on an existing public data set.

In another example of the semantic segmentation model training apparatus of the present disclosure, based on the embodiment above, the apparatus further includes a network fine adjustment unit, configured to use stochastic gradient descent to train the convolutional neural network until a preset convergence condition is satisfied.

The present embodiment implements fine adjustment on the convolutional neural network. Optionally, the fine adjustment process may include: 1. using a convolutional neural network of a VGG-16 network structure; 2. setting an initial learning rate of the convolutional neural network as 0.01, which may iteratively descend by 10 times every 30000 rounds; 3. using a random gradient descent algorithm to finely adjust and optimize a semantic segmentation task, where in this process, eight GPUs are used to conduct distributed computing; 4. a random gradient descent algorithm: randomly selecting a batch of data (16 images in this case), inputting the data to a network, performing forward propagation to obtain a result, calculating an error between the result and a labeled result, using back propagation to obtain at least one layer of errors, calculating the gradient of parameters of at least one layer according to the at least one layer of errors, correcting the parameter values according to the gradient, and making the network converge in a constant correction process; 5. making the network to converge at the 60000 rounds of iteration; and 6. using the convolutional neural network to performing a test on an existing public data set.

According to one aspect of the embodiments of the present disclosure, provided is an electronic device, including a processor, where the processor includes the semantic segmentation model training apparatus according to any one of the foregoing embodiments of the present disclosure.

According to one aspect of the embodiments of the present disclosure, provided is an electronic device, including: a memory configured to store executable instructions; and a processor, configured to communicate with the memory to execute the executable instruction to achieve operations of any embodiment of the semantic segmentation model training method of the present disclosure.

According to one aspect of the embodiments of the present disclosure, provided is a computer storage medium, configured to store computer-readable instructions, where when the instructions are executed, the operations of any embodiment of the semantic segmentation model training method of the present disclosure are executed.

The embodiments of the present disclosure further provide a computer program, including a computer-readable code, where when the computer-readable code runs in a device, a processor in the device executes instructions for implementing operations of the semantic segmentation model training method according to any one of the embodiments of the present disclosure.

Figure 5:
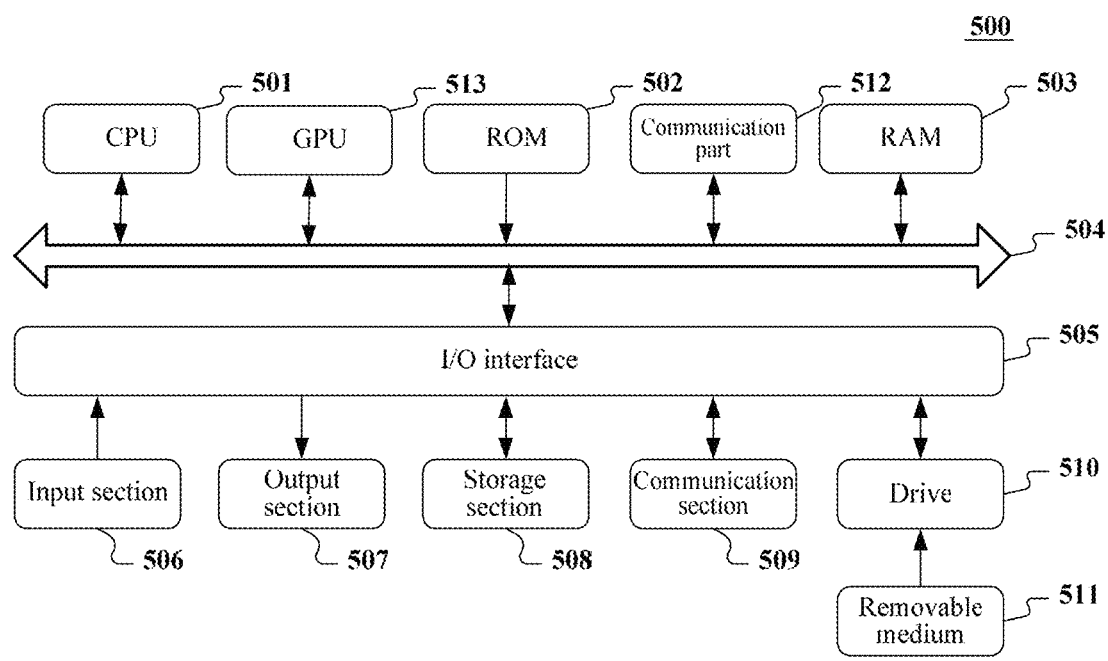
FIG. 5 is a schematic structural diagram of an embodiment of an electronic device of the present disclosure.

The embodiments of the present disclosure further provide an electronic device which, for example, is a mobile terminal, a Personal Computer (PC), a tablet computer, a server, or the like. Referring to FIG. 5 below, a schematic structural diagram of an electronic device 500, which may be a terminal device or a server, suitable for implementing the embodiments of the present disclosure is shown. As shown in FIG. 5, the electronic device 500 includes one or more processors, a communication part, and the like. The one or more processors are, for example, one or more Central Processing Units (CPUs) 501 and/or one or more Graphic Processing Units (GPUs) 513, and may execute appropriate actions and processing according to executable instructions stored in a Read-Only Memory (ROM) 502 or executable instructions loaded from a storage section 508 to a Random Access Memory (RAM) 503. The communication part 512 may include, but is not limited to, a network card. The network card may include, but is not limited to, an IB network card.

The processors may communicate with the ROM 502 and/or the RAM 503 to execute the executable instruction, and may be connected to the communication part 512 by a bus 504 and thus communicate with other target devices by the communication part 512, so as to complete the corresponding operations of any method provided by the embodiments of the present disclosure, for example, performing, by a semantic segmentation model, image semantic segmentation on at least one unlabeled image to obtain a preliminary semantic segmentation result as the category of the unlabeled image; obtaining, by a convolutional neural network based on the category of the at least one unlabeled image and the category of at least one labeled image, sub-images respectively corresponding to the at least two images and features corresponding to the sub-images, where the at least two images include the at least one unlabeled image and the at least one labeled image, and the at least two sub-images carry the categories of the corresponding images; and training the semantic segmentation model on the basis of the categories of the at least two sub-images and feature distances between the at least two sub-images.

In addition, the RAM 503 further stores various programs and data required for operations of the apparatus. The CPU 501, the ROM 502, and the RAM 503 are connected to each other via the bus 504. In the presence of the RAM 503, the ROM 502 is an optional module. The RAM 503 stores executable instructions, or writes the executable instructions into the ROM 502 during running, where the executable instructions cause the CPU 501 to execute corresponding operations of the foregoing communication method. An input/output (I/O) interface 505 is also connected to the bus 504. The communication part 512 may be integrated, or may be configured to have a plurality of sub-modules (for example, a plurality of IB network cards) connected to the bus.

The following components are connected to the I/O interface 505: an input section 506 including a keyboard, a mouse, or the like; an output section 507 including a Cathode-Ray Tube (CRT), a Liquid Crystal Display (LCD), a speaker, or the like; the storage section 508 including a hard disk, or the like; and a communication section 509 of a network interface card including an LAN card, a modem, or the like. The communication section 509 performs communication processing via a network such as the Internet. A drive 510 is also connected to the I/O interface 505 according to requirements. A removable medium 511 such as a magnetic disk, an optical disk, a magneto-optical disk, a semiconductor memory or the like is mounted on the drive 510 according to requirements, so that a computer program read from the removable medium is installed on the storage section 508 according to requirements.

It should be noted that the architecture illustrated in FIG. 5 is merely an optional implementation mode. During specific practice, the number and types of the components in FIG. 5 may be selected, decreased, increased, or replaced according to actual requirements. Different functional components may be separated or integrated or the like. For example, the GPU 513 and the CPU 501 may be separated, or the GPU 513 may be integrated on the CPU 501, and the communication part may be separated from or integrated on the CPU 501 or the GPU 513 or the like. These alternative implementations all fall within the scope of protection of the present disclosure.

Particularly, the process described above with reference to the flowchart according to the embodiments of the present disclosure may be implemented as a computer software program. For example, the embodiments of the disclosure includes a computer program product, including a computer program physically included on a computer-readable medium the computer program includes a program code for executing the method shown in the execution flow chart; the program code may include corresponding instructions for executing method operations provided by the embodiments of the present disclosure, for example, performing, by a semantic segmentation model, image semantic segmentation on at least one unlabeled image to obtain a preliminary semantic segmentation result as the category of the unlabeled image; obtaining, by a convolutional neural network based on the category of the at least one unlabeled image and the category of at least one labeled image, sub-images respectively corresponding to the at least two images and features corresponding to the sub-images, where the at least two images include the at least one unlabeled image and the at least one labeled image, and the at least two sub-images carry the categories of the corresponding images; and training the semantic segmentation model on the basis of the categories of the at least two sub-images and feature distances between the at least two sub-images. In such embodiment, the computer program is downloaded and installed from the network through the communication section 509, and/or is installed from the removable medium 511. The computer program, when being executed by the CPU 501, executes the foregoing functions defined in the methods of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. The foregoing specific sequence of operations of the method is merely for description, and unless otherwise stated particularly, is not intended to limit the operations of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A semantic segmentation model training method, comprising:
    performing, by a semantic segmentation model, image semantic segmentation on at least one unlabeled image to obtain a preliminary semantic segmentation result as a category of the at least one unlabeled image;
    obtaining, by a convolutional neural network based on the category of the at least one unlabeled image and a category of at least one labeled image, sub-images respectively corresponding to at least two images and features corresponding to the sub-images, wherein the at least two images comprise the at least one unlabeled image and the at least one labeled image, and the at least two sub-images carry the categories of the corresponding images; and
    training the semantic segmentation model on the basis of the categories of the at least two sub-images and feature distances between the at least two sub-images, which comprises:

establishing a patch graph according to category relations between the sub-images, wherein the patch graph comprises nodes and an edge, wherein the nodes comprise the sub-images, and the edge comprises a feature distance between any two sub-images; and training the semantic segmentation model to enable the feature distance between two sub-images of a same category in the patch graph to be lower than a first preset value, and the feature distance between two sub-images of different categories to be greater than a second preset value, wherein the training the semantic segmentation model comprises:

training the semantic segmentation model by a gradient back propagation algorithm, so as to minimize an error of the convolutional neural network, wherein the error is a triplet loss of the features of the corresponding sub-images obtained based on the convolutional neural network, wherein the training the semantic segmentation model by a gradient back propagation algorithm comprises:

calculating a maximum error by a loss function according to the feature distance between the sub-images in the established patch graph; performing gradient back propagation on the maximum error to calculate an error of at least one layer in the convolutional neural network;

calculating a gradient of parameters of at least one layer according to the error of the at least one layer, and modifying the parameters of a corresponding layer in the convolutional neural network according to the gradient;

calculating an error according to the distance between sub-images outputted by the convolutional neural network with the optimized parameters, and taking the error as the maximum error;

iteratively implementing following operations until the maximum error is lower than or equal to a preset value:

performing gradient back propagation on the maximum error to calculate an error of at least one layer in the convolutional neural network; and calculating the gradient of parameters of at least one layer according to the error of the at least one layer, and modifying the parameters of the corresponding layer in the convolutional neural network according to the gradient.

2. The method according to claim 1, wherein the establishing a patch graph according to category relations between the sub-images comprises:

selecting at least one sub-image as a reference node, and for at least one reference node:

using a sub-image of a same category as the reference node as a positively correlated node, using a sub-image of a different category from the reference node as a negatively correlated node, and separately establishing a positive correlation connection between the reference node and at least one positively correlated node, and a negative correlation connection between the reference node and at least one negatively correlated node; and forming a sparse connectivity patch graph according to the at least one reference node, the positively correlated node of the reference node, the negatively correlated node of the reference node, the positive correlation connection, and the negative correlation connection.

3. The method according to claim 1, wherein the training the semantic segmentation model comprises:

obtaining parameters of the convolutional neural network based on a training result of the convolutional neural network; and initializing parameters in the semantic segmentation model based on the obtained parameters of the convolutional neural network.

4. The method according to claim 1, wherein the obtaining, by a convolutional neural network based on the category of the at least one unlabeled image and a category of at least one labeled image, sub-images respectively corresponding to at least two images and features corresponding to the sub-images comprises:

in response to movement of a select box with a preset size on the at least two images, performing determination on pixels in the select box, and when a proportion of pixels of a same category among the pixels in the select box is greater than or equal to a preset value, outputting the image in the select box as a sub-image, and labeling the sub-image as said category; and obtaining features corresponding to the sub-images by the convolutional neural network.

5. The method according to claim 4, further comprising: when the proportion of the pixels of the same category among the pixels in the select box is less than the preset value, discarding the select box.

6. The method according to claim 4, wherein the obtaining features corresponding to the sub-images by the convolutional neural network comprises:

performing feature extraction respectively on the unlabeled image and the labeled image by the convolutional neural network, so as to obtain features maps respectively corresponding to the unlabeled image and the labeled image; and obtaining, based on a position and size of the select box corresponding to the sub-image, the corresponding feature in the select box from the corresponding feature map, so as to determine the features corresponding to the sub-image.

7. The method according to claim 1, further comprising: before performing, by the semantic segmentation model, image semantic segmentation on the at least one unlabeled image, using stochastic gradient descent to train the semantic segmentation model until a preset convergence condition is satisfied.

8. The method according to claim 1, further comprising: before obtaining, by the convolutional neural network based on the category of the at least one unlabeled image and a category of the at least one labeled image, the sub-images respectively corresponding to the at least two images and the features corresponding to the sub-images, using stochastic gradient descent to train the convolutional neural network until a preset convergence condition is satisfied.

9. A semantic segmentation model training apparatus, comprising:

a memory storing processor-executable instructions; and a processor arranged to execute the stored processor-executable instructions to perform operations of:

performing, by a semantic segmentation model, image semantic segmentation on at least one unlabeled image to obtain a preliminary semantic segmentation result as a category of the at least one unlabeled image;

obtaining, by a convolutional neural network based on the category of the at least one unlabeled image and a category of at least one labeled image, sub-images respectively corresponding to at least two images and features corresponding to the sub-images, wherein the at least two images comprise the at least one unlabeled image and the at least one labeled image, and the at least two sub-images carry the categories of the corresponding images; and training the semantic segmentation model on the basis of the categories of the at least two sub-images and feature distances between the at least two sub-images, which comprises:

establishing a patch graph according to category relations between the sub-images, wherein the patch graph comprises nodes and an edge, wherein the nodes comprise the sub-images, and the edge comprises a feature distance between any two sub-images; and training the semantic segmentation model to enable the feature distance between two sub-images of a same category in the patch graph to be lower than a first preset value, and the feature distance between two sub-images of different categories to be greater than a second preset value, wherein the training the semantic segmentation model comprises:

training the semantic segmentation model by a gradient back propagation algorithm, so as to minimize an error of the convolutional neural network, wherein the error is a triplet loss of the features of the corresponding sub-images obtained based on the convolutional neural network, wherein the training the semantic segmentation model by a gradient back propagation algorithm comprises:

calculating a maximum error by a loss function according to the feature distance between the sub-images in the established patch graph;

performing gradient back propagation on the maximum error to calculate an error of at least one layer in the convolutional neural network;

calculating a gradient of parameters of at least one layer according to the error of the at least one layer, and modify the parameters of a corresponding layer in the convolutional neural network according to the gradient;

calculating an error according to the distance between sub-images outputted by the convolutional neural network with the optimized parameters, and take the error as the maximum error;

iteratively implementing following operations until the maximum error is lower than or equal to a preset value;

performing gradient back propagation on the maximum error to calculate an error of at least one layer in the convolutional neural network; and calculating the gradient of parameters of at least one layer according to the error of the at least one layer, and modify the parameters of the corresponding layer in the convolutional neural network according to the gradient.

10. The apparatus according to claim 9, wherein the establishing a patch graph according to category relations between the sub-images comprises:

selecting at least one sub-image as a reference node, and for at least one reference node:

using a sub-image of a same category as the reference node as a positively correlated node, using a sub-image of a different category from the reference node as a negatively correlated node, and separately establishing a positive correlation connection between the reference node and at least one positively correlated node, and a negative correlation connection between the reference node and at least one negatively correlated node; and forming a sparse connectivity patch graph according to the at least one reference node, the positively correlated node of the reference node, the negatively correlated node of the reference node, the positive correlation connection, and the negative correlation connection.

11. The apparatus according to claim 9, wherein the training the semantic segmentation model comprises:

obtaining parameters of the convolutional neural network based on a training result of the convolutional neural network; and initializing parameters in the semantic segmentation model based on the obtained parameters of the convolutional neural network.

12. The apparatus according to claim 9, wherein the obtaining, by a convolutional neural network based on the category of the at least one unlabeled image and a category of at least one labeled image, sub-images respectively corresponding to at least two images and features corresponding to the sub-images comprises:

in response to movement of a select box with a preset size on the at least two images, performing determination on pixels in the select box, and when the proportion of pixels of the same category among the pixels in the select box is greater than or equal to a preset value, outputting the image in the select box as a sub-image, and labeling the sub-image as said category; and obtaining features corresponding to the sub-images by the convolutional neural network.

13. The apparatus according to claim 12, wherein the processor is arranged to execute the stored processor-executable instructions to further perform an operation of:

when the proportion of the pixels of the same category among the pixels in the select box is less than the preset value, discarding the select box.

14. A non-transitory computer storage medium having stored thereon computer-readable instructions that, when executed by a processor, cause the processor to implement operations of a semantic segmentation model training method, the method comprising:

performing, by a semantic segmentation model, image semantic segmentation on at least one unlabeled image to obtain a preliminary semantic segmentation result as a category of the at least one unlabeled image;

obtaining, by a convolutional neural network based on the category of the at least one unlabeled image and a category of at least one labeled image, sub-images respectively corresponding to at least two images and features corresponding to the sub-images, wherein the at least two images comprise the at least one unlabeled image and the at least one labeled image, and the at least two sub-images carry the categories of the corresponding images; and training the semantic segmentation model on the basis of the categories of the at least two sub-images and feature distances between the at least two sub-images, which comprises:

establishing a patch graph according to category relations between the sub-images, wherein the patch graph comprises nodes and an edge, wherein the nodes comprise the sub-images, and the edge comprises a feature distance between any two sub-images; and training the semantic segmentation model to enable the feature distance between two sub-images of a same category in the patch graph to be lower than a first preset value, and the feature distance between two sub-images of different categories to be greater than a second preset value, wherein the training the semantic segmentation model comprises:
training the semantic segmentation model by a gradient back propagation algorithm, so as to minimize an error of the convolutional neural network, wherein the error is a triplet loss of the features of the corresponding sub-images obtained based on the convolutional neural network,
wherein the training the semantic segmentation model by a gradient back propagation algorithm comprises:
calculating a maximum error by a loss function according to the feature distance between the sub-images in the established patch graph; performing gradient back propagation on the maximum error to calculate an error of at least one layer in the convolutional neural network;
calculating a gradient of parameters of at least one layer according to the error of the at least one layer, and modifying the parameters of a corresponding layer in the convolutional neural network according to the gradient;
calculating an error according to the distance between sub-images outputted by the convolutional neural network with the optimized parameters, and taking the error as the maximum error;
iteratively implementing following operations until the maximum error is lower than or equal to a preset value:
performing gradient back propagation on the maximum error to calculate an error of at least one layer in the convolutional neural network; and
calculating the gradient of parameters of at least one layer according to the error of the at least one layer, and modifying the parameters of the corresponding layer in the convolutional neural network according to the gradient.

15. The non-transitory computer storage medium according to claim 14, wherein the establishing a patch graph according to category relations between the sub-images comprises:
selecting at least one sub-image as a reference node, and for at least one reference node:
using a sub-image of a same category as the reference node as a positively correlated node, using a sub-image of a different category from the reference node as a negatively correlated node, and separately establishing a positive correlation connection between the reference node and at least one positively correlated node, and a negative correlation connection between the reference node and at least one negatively correlated node; and
forming a sparse connectivity patch graph according to the at least one reference node, the positively correlated node of the reference node, the negatively correlated node of the reference node, the positive correlation connection, and the negative correlation connection.

16. The non-transitory computer storage medium according to claim 14, wherein the training the semantic segmentation model comprises:
obtaining parameters of the convolutional neural network based on a training result of the convolutional neural network; and
initializing parameters in the semantic segmentation model based on the obtained parameters of the convolutional neural network.

17. The non-transitory computer storage medium according to claim 14, wherein the obtaining, by a convolutional neural network based on the category of the at least one unlabeled image and a category of at least one labeled image, sub-images respectively corresponding to at least two images and features corresponding to the sub-images comprises:
in response to movement of a select box with a preset size on the at least two images, performing determination on pixels in the select box, and when a proportion of pixels of a same category among the pixels in the select box is greater than or equal to a preset value, outputting the image in the select box as a sub-image, and labeling the sub-image as said category; and
obtaining features corresponding to the sub-images by the convolutional neural network.

18. The non-transitory computer storage medium according to claim 17, wherein the method further comprises: when the proportion of the pixels of the same category among the pixels in the select box is less than the preset value, discarding the select box.

19. The non-transitory computer storage medium according to claim 17, wherein the obtaining features corresponding to the sub-images by the convolutional neural network comprises:
performing feature extraction respectively on the unlabeled image and the labeled image by the convolutional neural network, so as to obtain features maps respectively corresponding to the unlabeled image and the labeled image; and
obtaining, based on a position and size of the select box corresponding to the sub-image, the corresponding feature in the select box from the corresponding feature map, so as to determine the features corresponding to the sub-image.

20. The non-transitory computer storage medium according to claim 14, wherein the method further comprises: before performing, by the semantic segmentation model, image semantic segmentation on the at least one unlabeled image,
using stochastic gradient descent to train the semantic segmentation model until a preset convergence condition is satisfied.

* * * * *